United States Patent
Sandrart et al.

(10) Patent No.: US 6,830,215 B2
(45) Date of Patent: Dec. 14, 2004

(54) PIVOTING TRANSMISSION UNIT WITH A DEVICE TO TAKE UP PLAY ALONG THE PIVOT AXIS

(75) Inventors: Thierry Sandrart, Velaux (FR); Lionel Thomassey, Fos sur Mer (FR)

(73) Assignee: Eurocopter, Marignane Cedex (FR)

( * ) Notice: Subject to any disclaimer, the term of this patent is extended or adjusted under 35 U.S.C. 154(b) by 0 days.

(21) Appl. No.: 10/282,893

(22) Filed: Oct. 29, 2002

(65) Prior Publication Data

US 2003/0168863 A1 Sep. 11, 2003

(30) Foreign Application Priority Data

Nov. 6, 2001 (FR) .............................................. 01 14328

(51) Int. Cl.$^7$ .............................................. B64D 27/00
(52) U.S. Cl. ............................. 244/56; 244/7 R; 74/417
(58) Field of Search ................................ 244/7 R, 7 C, 244/56, 66; 74/594, 417, 606 R

(56) References Cited

U.S. PATENT DOCUMENTS

| | | | | |
|---|---|---|---|---|
| 1,392,763 A | * | 10/1921 | Hedtler et al. ................ 244/66 |
| 1,868,975 A | * | 7/1932 | Hall .............................. 244/66 |
| 3,942,387 A | * | 3/1976 | Stone et al. ................... 74/417 |
| 5,239,880 A | * | 8/1993 | Hawkins et al. .............. 74/406 |
| 6,260,793 B1 | | 7/2001 | Balayn et al. |
| 6,276,633 B1 | | 8/2001 | Balayn et al. |
| 6,676,073 B2 | * | 1/2004 | Thomassey .................. 244/7 R |

* cited by examiner

Primary Examiner—Michael J. Carone
Assistant Examiner—Gabriel S. Sukman
(74) Attorney, Agent, or Firm—Sturm & Fix LLP

(57) ABSTRACT

A pivoting power transmission unit is provided for transmitting rotational drive to a rotor configured to revolve about an axis of rotation and configured to be swivelled about a pivot axis substantially perpendicular to said rotation axis. The unit comprises a casing mounted between two parts of a support by two bearings co-axial with the pivot axis. Each bearing includes a stationary part attached to the support, swivelling part attached to the casing and a wear take-up ring disposed therebetween. The unit further comprises a device to take up axial play between the casing and the support. The device includes an annular piston, sliding axially in a chamber fed with fluid under pressure, and bearing against an axial end of the wear take-up ring.

12 Claims, 2 Drawing Sheets

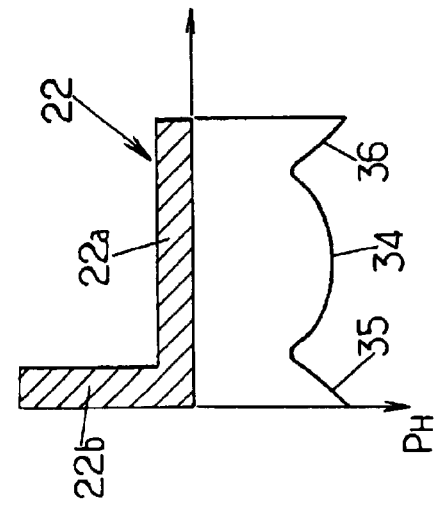
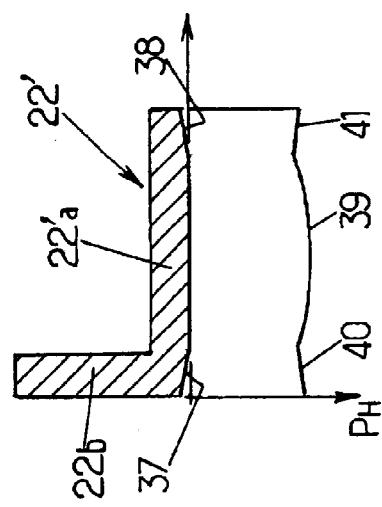
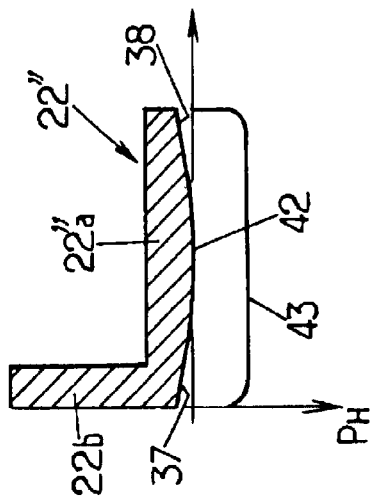
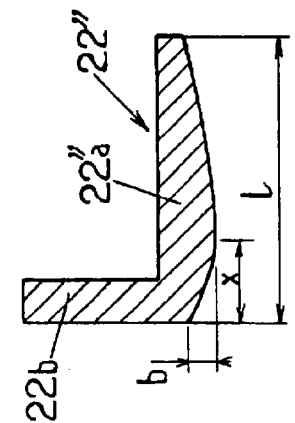
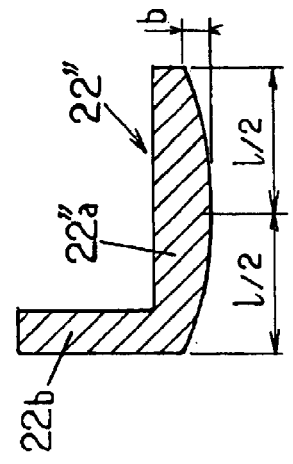
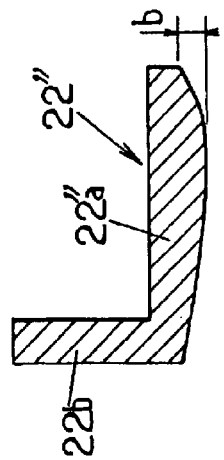

PIVOTING TRANSMISSION UNIT WITH A DEVICE TO TAKE UP PLAY ALONG THE PIVOT AXIS

FIELD OF THE INVENTION

The invention relates to a pivoting transmission unit, and more precisely a power transmission unit mounted so as to swivel about a pivot axis, to drive in rotation at least one driven component about an axis of rotation which has to be capable of swivelling about the pivot axis, substantially perpendicular to the axis of rotation of the driven component. The transmission unit comprises a casing mounted so as to pivot on and preferably between two stationary and rigid side parts of a support by two coaxial bearings about the pivot axis and spaced at a distance from each other along this pivot axis.

The pivoting power transmission unit according to the invention can be used, in a non-limiting manner, as a power transmission unit fitted to aircraft on which the propulsion system is swivellable, such as dirigible balloons or aircraft of the type known as convertible, or again as a power transmission unit fitted to wind turbines.

In general terms, the pivoting power transmission unit according to the invention can be used in all swivellable propulsion systems or systems generating energy by rotation which, to operate satisfactorily, must have no axial movement (in the direction of the pivot axis).

In particular, as an application for which the pivoting power transmission unit according to the invention is of great relevance for the applicant, such a transmission unit can be used to drive in rotation, from at least one power unit, of the turboshaft engine type, for example, at least one tilting rotor of an aircraft of the convertible type, which can operate in aeroplane mode or in helicopter mode, and in which the rotor drive shaft swivels about a pivot axis so that it can move from one position, in which the rotor operates as an aircraft propeller, for the aircraft to fly in aeroplane mode, to a position in which the rotor operates as a helicopter lift rotor, for the aircraft to fly in helicopter mode.

BACKGROUND OF THE PRESENT INVENTION

A pivoting power transmission unit for such a convertible aircraft with tilting rotors is described in particular in FR 2 791 319 and FR 2 791 634 to which reference should be made for further details.

It is pointed out however that these two patents describe a convertible aircraft with tilting rotors of the type in which the shaft of each rotor is driven in rotation about itself by a pivoting front reduction gear unit of one respectively of two power transmissions each also comprising a stationary rear reduction gear unit linked to the corresponding front reduction gear unit, and also to one respectively of two (turboshaft) engines, each supported by one respectively of the two fixed wings of the aircraft, and to an interconnecting shaft linking the two transmissions for the two rotors to be driven in rotation by any one of the two engines in case of failure of the other engine.

The shaft of each rotor, the corresponding power transmission and the corresponding engine are housed in one respectively of two articulated cowlings, each comprising a front part mounted, so as to pivot about the pivot axis, on a stationary rear part, fixed to one respectively of the two fixed wings of the aircraft, and in which are housed the corresponding engine and at least in part the rear reduction gear unit of the corresponding transmission, the front reduction gear unit of which, embodied as a helicopter main gearbox, and also the shaft of the corresponding rotor are housed in the pivoting front part of the cowling, and are mounted so as to pivot with this front part of the cowling relative to the stationary rear part of the cowling and the corresponding fixed wing.

In this application and with this architecture of each power transmission, the swivelling joint of the pivoting front reduction gear unit operates over only a limited angular sector of pivoting of about 110°, with a low speed of rotation of between about 1 and about 2 rpm, and under static load.

Consequently, the two bearings by which the casing of the swivelling front reduction gear unit or pivoting power transmission unit is mounted so as to pivot on the support, namely the stationary rear part of the cowling, are subject to false Brinelling, which is particularly noticeable when the bearings are rolling-element bearings, of the needle or roller bearing type.

SUMMARY OF THE INVENTION

The problem at the basis of the invention is to reduce if not completely eliminate this false Brinelling in the bearings and, in general terms, to propose a pivoting mounting of the power transmission unit on its support which is better suited to the various requirements of actual practice than the embodiments of the state of the art, and more precisely which offers better dynamic behaviour of the propulsion system in which such a pivoting power transmission unit is incorporated, in particular by substantially reducing the axial play, and therefore the movements of this propulsion system, along the pivot axis and also, preferably, the pressures in the bearings mentioned above.

To this end, there is provided in accordance with the present invention a pivoting power transmission unit for transmitting rotations drive to at least one driven component configured to revolve about an axis of rotation and configured to be swivelled about a pivot axis substantially perpendicular to said axis of rotation, said transmission unit comprising a casing mounted so as to pivot relative to two stationary and rigid side parts of a support by two coaxial bearings about said pivot axis and spaced at a distance from each other along the pivot axis, wherein the two bearings are plain bearings, each of which comprises:

a stationary part integral with one respectively of the two side parts of said support, and comprising a substantially cylindrical sleeve;

a swivelling part integral with said pivoting casing and comprising a substantially cylindrical annular trunnion mounted so as to swivel about said sleeve of the stationary part of said bearing; and a wear take-up ring, based on a material with a low coefficient of friction, and comprising a cylindrical tubular part held axially between said sleeve of said stationary part and said trunnion of said moving part, and a radial collar projecting radially outwards from said tubular part and relative to its axis, and integral with one axial end of said tubular part which faces towards the respective side part of the support;

and wherein the transmission unit further comprises a device to take up play along the pivot axis, associated with at least one bearing so as to push the wear take-up ring and swivelling part of its corresponding bearing axially away from its respective side part of the support.

The substantially cylindrical sleeves of the stationary parts of the two bearings may be substantially coaxial with the pivot axis, and may extend towards each other from the side parts of the support. The substantially cylindrical annular trunnions of the swivelling parts of the two bearings may be substantially coaxial with the pivot axis.

In an advantageously simple, compact and economical mode of embodiment, the play take-up device comprises at least one annular piston, fitted so as to slide with sealing, along the pivot axis, in at least one annular chamber made in a stationary side part of said support and opening towards the wear take-up ring of said bearing associated with said play take-up device, said annular chamber being fed with fluid under pressure, for example hydraulic fluid, so that said annular piston bears axially against the radial collar of said wear take-up ring, which pushes the swivelling part of said bearing and said pivoting casing relative to the support, along the pivot axis.

A circuit for pressurising the annular chamber of the play take-up device may be provided but, advantageously, this annular chamber is fed with fluid under pressure, for example hydraulic fluid, by at least one tapping from at least one lubrication circuit of said transmission unit, for example.

Moreover, in order not to introduce a resisting torque when the transmission unit pivots, the annular piston advantageously has a bearing face at least partly covered with a coating based on a material with a low coefficient of friction, by which the piston bears against said collar of said wear take-up ring.

In this case, it is advantageous for the coating of the piston and the wear take-up ring to be based on the same material with a low coefficient of friction, for example PTFE.

Moreover, for better operation of the play take-up device together with a better pivoting mounting of the casing provided by the bearings, the wear take-up ring of at least one bearing, and preferably of each of them, is fixed to the swivelling part of said bearing.

The wear take-up ring is fixed to the swivelling part of the corresponding bearing, in an advantageously simple manner, by at least three screws passing, in a direction substantially parallel to the pivot axis, through said radial collar, in an area situated outside the area of contact with the annular piston, and screwed into said swivelling part of said corresponding bearing.

Also advantageously, in order to reduce the Hertz pressures in the bearings, the tubular part of the wear take-up ring of at least one bearing, and preferably of each of them, has an inner radial contact surface with a shape which is slightly cambered and convex towards the pivot axis, the location and amplitude of the convex cambered shape being such that said inner radial contact surface assumes a substantially cylindrical shape of circular cross-section under the load, especially the static load, applied to said pivoting casing.

Moreover, in order also to reduce the pressure peaks at the axial ends of the inner radial contact surface of the wear take-up ring of least one bearing, and preferably of each of them, this inner radial contact surface has a relieved area in the form of a chamfer or inclined flat at one at least of its two axial ends, and preferably at each of said two axial ends.

Finally, for application to a convertible aircraft with tilting rotors, the bearings are stressed over a limited angular sector of pivoting, of about 110°, with a low speed of rotation of between about 1 and about 2 rpm, of said pivoting casing under static load, about the pivot axis.

BRIEF DESCRIPTION OF THE DRAWINGS

Other characteristics and advantages of the invention will become clear from the description given below, by way of a non-limiting example of embodiment, with reference to the appended drawings in which:

FIGS. 6, 7 and 8 show schematic views of other axial half-sections of the wear take-up ring with variants of embodiment of the camber on its inner radial contact surface.

DETAILED DESCRIPTION OF SPECIFIC EMBODIMENT

Figure 1:
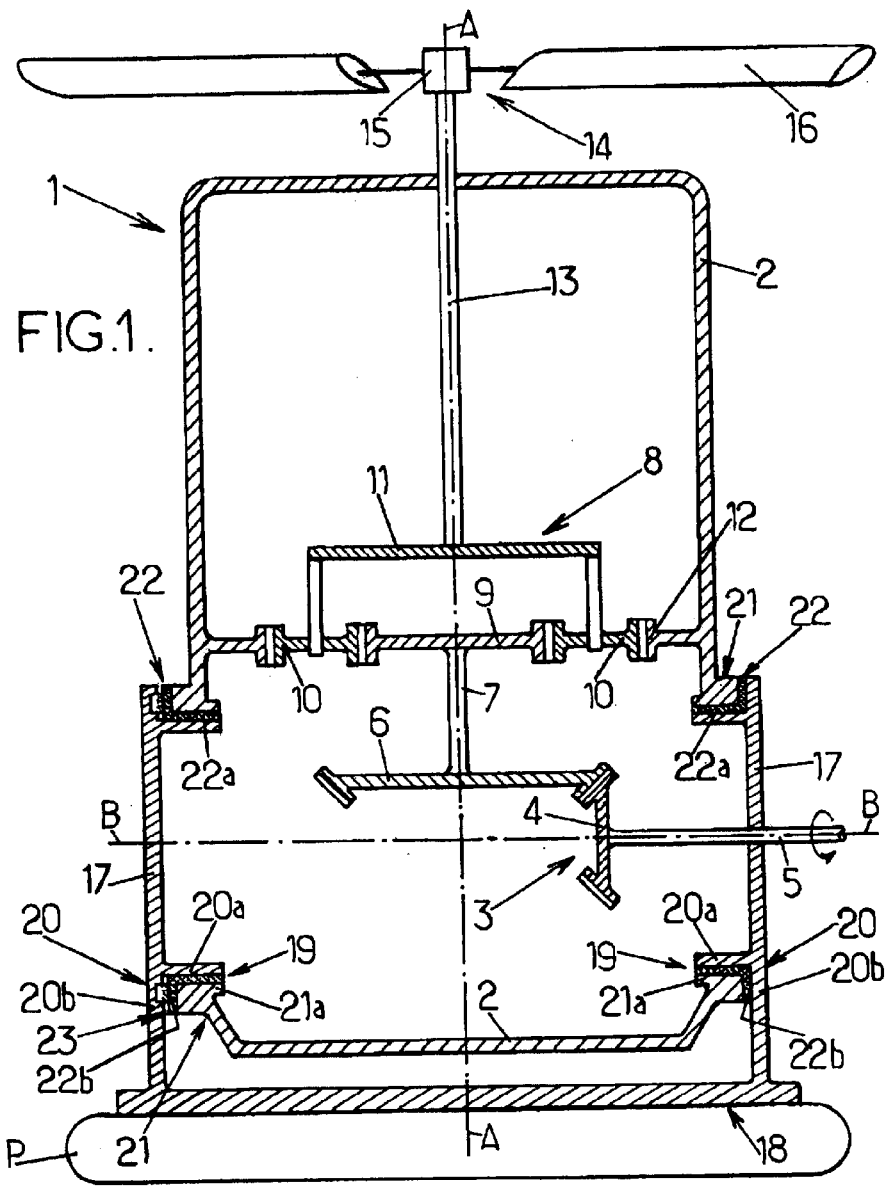
FIG. 1 is a partial schematic view in axial section of a pivoting power transmission unit according to the invention.

The pivoting power transmission unit 1 shown in FIG. 1 comprises a pivoting casing 2 housing a reduction gear unit which, in the application cited above when driving in rotation a tilting rotor of a convertible aircraft as described in the two patent documents cited above, constitutes the pivoting front reduction gear unit, arranged as a helicopter main gearbox, of a transmission linking an engine to this rotor and to an interconnecting shaft to another similar transmission, this transmission comprising a non-pivoting rear reduction gear unit, supported by a structure fixed to the structure of the aircraft, for example the structure of a stationary rear part of a drive pod, the pivoting front part of which encloses the power transmission unit 1.

In the example shown, the reduction gear unit housed in the pivoting casing 2 comprises two reduction gear stages, one of them an input stage 3, which is a spiral bevel gear reduction stage comprising a primary bevel gear 4, driven in rotation, about the pivot axis B—B of the transmission unit 1, by a coaxial shaft 5, itself driven in rotation from the non-pivoting rear reduction gear unit (not shown), the teeth of the bevel gear 4 being meshed with those of a secondary bevel gear 6 joined in rotation, about an axis A—A, substantially perpendicular to the pivot axis B—B, with a coaxial shaft 7 interconnecting the first reduction gear stage or input stage 3 to the second reduction gear stage or output reduction gear stage 8.

This reduction gear stage 8 is an epicyclic stage, comprising a sun gear 9, joined in rotation with the shaft 7 and with the bevel gear 6 about the axis A—A, and the teeth of this are meshed with those of the planet gears 10 mounted so as to rotate about axes parallel to the axis A—A on a planet gear carrier 11, the teeth of the planet gears 10 being also meshed with the internal teeth of an outer peripheral ring gear 12 stationary inside the pivoting casing 2. The planet gear carrier 11 is joined in coaxial rotation, about the axis A—A, with a rotor mast 13, guided in rotation in the casing 2 by bearings, not shown, and the upper end of this projects outside the casing 2 and is integral with the hub 15 supporting blades 16 of a rotor 14, and thus driven in rotation about the axis A—A, which is the axis of rotation of the rotor.

This rotor 14 as well as the power transmission unit 1 comprising the reduction gear stages 3 and 8 are able to pivot about the pivot axis B—B with the casing 2, mounted so as to pivot about this axis B—B between two stationary and rigid side parts 17 of a support, designated as a whole by the number 18, and which is itself stationary and rigid, for example, in the application considered, a support rigidly linked to the structure of the stationary rear part of the engine cowling, which is itself integral with the structure of one wing of the aircraft (shown schematically as P in FIG. 1).

The swivelling mounting of the casing 2 about the axis B—B and between the two side parts 17 of the support 18 is provided by two coaxial plain bearings 19 about the pivot axis B—B and spaced apart from each other along this axis B—B so that each bearing 19 is adjacent to one respectively of the side parts 17 of the stationary support.

Each bearing 19 comprises a stationary part 20, integral with the adjacent side part 17 of the support, and comprising a sleeve 20a, substantially cylindrical and of circular cross-section and substantially coaxial with the sleeve 20a of the stationary part 20 of the other bearing 19, about the pivot axis B—B, each sleeve 20a extending towards the other sleeve 20a from the corresponding stationary side part 17. Each stationary part 20 also comprises an annular shoulder 20b, radial relative to the axis B—B, projecting towards the outside of the sleeve 20a, and which may be added to the corresponding stationary side part 17 of the support or integrated with this part 17.

Each bearing 19 also comprises a swivelling part 21, which is integral with the pivoting casing 2, in the part of the latter extending below the ring gear 12, this swivelling part 21 comprising an annular trunnion 21a which is substantially cylindrical and of circular cross-section, at least on its inner radial contact surface, and which is substantially coaxial with the trunnion 21a of the swivelling part 21 of the other bearing 19.

In each bearing 19, the trunnion 21a of the swivelling part 21 is mounted so as to swivel about the sleeve 20a of the stationary part 20, and each bearing 19 also comprises a wear take-up ring 22 produced on the basis of a material with a low coefficient of friction, and which is placed between the stationary part 20 and swivelling part 21 of the corresponding bearing 19.

Each wear take-up ring 22 comprises a tubular part 22a, substantially cylindrical and of circular cross-section, which is held axially between the sleeve 20a and the trunnion 21a belonging respectively to the stationary part 20 and the swivelling part 21 of this bearing 19. Each wear take-up ring 22 also comprises a radial collar 22b, which is an annular collar projecting radially towards the outside of the corresponding tubular part 22a, and relative to the axis of the latter, and which is integral with the one of the axial ends of the tubular part 22a which is turned towards the corresponding side part 17 of the support.

In this application of the pivoting power transmission unit 1, it is necessary to avoid any axial movement (along the pivot axis B—B) of this unit 1, and therefore of the rotor 14, and to this end, the transmission unit 1 is equipped, at its swivelling joint on the support 18, with a device taking up play along the pivot axis B—B, this play take-up device being designated as a whole in FIG. 1 by the number 23, and associated, for the sake of simplicity, with a single bearing 19, as shown schematically on the left half of FIG. 1, so that the wear take-up ring 22 and the swivelling part 21 of the left bearing 19 in FIG. 1, and therefore also the conical casing 2, are pushed away from the corresponding annular shoulder 20b of the stationary part 20 and side part 17 of support 18, and in this case-pushed towards the other bearing 19 and its fixed part 20 integral with the support 18.

Figure 2:
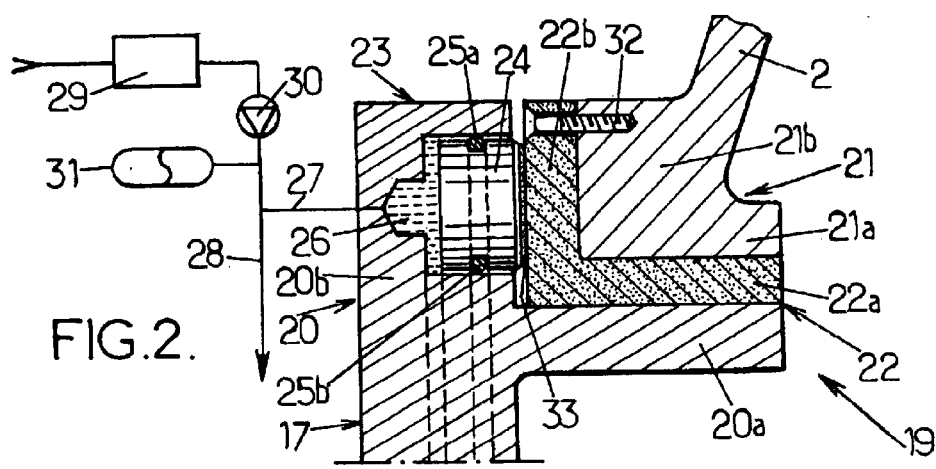
FIG. 2 is a partial schematic view in transverse section to a larger scale of a bearing and of the associated play take-up device, for the transmission unit in FIG. 1, FIGS. 3, 4 and 5 are half-views in axial section of modes of embodiment of the wear take-up ring of the bearing in FIG. 2, with associated curves representing the Hertz pressure and the pressures at the axial ends of the ring.

This axial play take-up device 23 and the corresponding bearing 19 are shown in more detail and to a larger scale on the axial half-section in FIG. 2, now described.

The play take-up device 23 comprises an annular piston 24, centred on the axis B—B, and with a transverse section substantially in the shape of a U on its side, equipped on each of its annular faces in the inner and outer radial positions (relative to its axis) with one respectively of two annular seals 25a and 25b, also centred on the axis B—B, O-rings for example, each housed in a corresponding peripheral groove, respectively inner or outer, in the piston 24, which is mounted so as to slide with sealing, parallel to its axis coaxial with the pivot axis B—B, in an annular chamber 26, of stepped cross-section in FIG. 2, made directly in the corresponding side part 17 of the support or, as shown in FIG. 2, in the annular shoulder 20b of the stationary part 20 which is integral with this side part 17 of the support or forms a single part with the latter. This annular chamber 26, substantially coaxial with the stationary part 20 about the pivot axis B—B, opens axially towards the wear take-up ring 22 of the associated bearing 19, and this chamber 26 is fed with fluid under pressure by a duct, shown schematically as 27, for example a tapping from the duct 28 of a hydraulic circuit on board the aircraft, this circuit comprising, as shown schematically in FIG. 2, a reservoir 29, a pump 30 and a pressure accumulator 31. This hydraulic circuit may be a lubrication circuit of the gearbox 1, in which case the duct 28 feeds a rotating hydraulic joint (not shown) to transfer lubrication fluid into the pivoting transmission unit 1.

As a result of the chamber 26 being fed under pressure in this way, the piston 24 is pushed axially towards the associated bearing 19 and against the radial collar 22b of the corresponding wear take-up ring 22, so that this axial contact of the piston 24 bearing against the collar 22b pushes the swivelling part 21 of the associated bearing 19 and therefore also the pivoting casing 2 relative to the support 18, and along the pivot axis B—B, thus eliminating any play along this axis.

To facilitate fitting and improve operation of the bearings 19, each wear take-up ring 22 is attached to the swivelling part 21 of the corresponding bearing 19 and, as shown in FIG. 2, the ring is attached for example by three screws 32 which are screwed, substantially parallel to the pivot axis B—B, through an area of the collar 22b of this ring 22 which is outside the area of contact with the piston 24, so that the ends of the shanks of the screws 32 are screwed into a radial shoulder 21b connecting the trunnion 21a of the swivelling part 21 of the bearing 19 to the rest of the pivoting casing 2, the heads of the screws 32 being countersunk into the radial face, in an outer axial position (towards the outside of the bearing 19) of the collar 22b.

On its contact face with the collar 22b, the piston 24 has a contact surface coating 33 which is produced on the basis of a material with a low coefficient of friction, and by which this piston 24 bears against the collar 22b of the wear take-up ring 22, in order not to introduce any resisting torque when the casing 2 pivots.

This coating 33 of the piston 24 and the wear take-up ring 22 are preferably produced of the same material with a low coefficient of friction, for example PTFE.

In the application cited above of the pivoting transmission unit 1 to driving a tilting rotor of a convertible aircraft, the swivelling joint provided by the bearings 19 between the pivoting casing 2 and the stationary support 18 operates over only a small angular sector, limited to about 110°, over which the bearings 19 are stressed, with a speed of rotation about the pivot axis B—B which is relatively low, between about 1 and about 2 rpm, while the pivoting casing 2 and therefore the bearings 19 are under static load. As the bearings 19 are subject to false Brinelling, their plain structure, according to the invention, is far more advantageous than rolling-element bearings and, moreover, the use of plain bearings 19 with a wear take-up ring 22 allows the optimum shape to be employed for the contact surface in the inner radial position on the tubular part 22a of the wear take-up ring 22, an inner radial contact surface required for the swivelling joint, in order to reduce the Hertz pressures and the pressure peak at one at least of the axial ends of this inner radial contact surface.

FIGS. 3 to 5 give schematic views in transverse section of three shapes of inner radial contact surface of the wear take-up ring superimposed on the curves showing, as a function of the axial position on the ring 22, the amplitude of the Hertz pressures and of the pressure peaks at the axial ends. FIG. 3 corresponds to a ring 22 on which the inner and outer radial contact surfaces of the tubular part 22a are perfectly cylindrical and of circular cross-section, and the corresponding curve 34 of the Hertz pressures shows substantial pressures with two pressure peaks at 35 and 36 at the axial ends of the tubular part 22a.

FIG. 4 shows a first variant of the wear take-up ring 22', in which relieved areas 37 and 38 in the form of chamfers or inclined truncated cone flats have been machined in each of the axial ends of the inner radial contact surface of the tubular part 22'a. The corresponding Hertz pressure curve 39 shows a lower and less variable pressure as a function of the axial position than the pressure curve 34 in FIG. 3, and in addition has highly attenuated pressure peaks 40 and 41 at the axial ends.

The second variant of the wear take-up ring 22" in FIG. 5 comprises the same relieved areas 37 and 38 as the ring 22' in FIG. 4, with in addition a cambered central part 42, convex towards the inside of the tubular part 22"a of this ring 22", with a camber amplitude b of the order of a few micrometres. It may be noted that the pressure curve 43 is of practically constant amplitude over the whole axial dimension of the ring 22", including its two axial ends, the Hertz pressure amplitudes being moreover smaller than those in the curve 39 in FIG. 4, which are themselves appreciably smaller than the pressures given by the curve 34 in FIG. 3.

The wear take-up ring 22 in FIG. 2 is therefore preferably a ring such as 22" in FIG. 5 on which, moreover, the location and amplitude of the camber b depend on the load applied to the corresponding bearing 19 and on the deformation of the surrounding parts, and on which the high point of the cambered part may be located substantially in the middle of the axial length "I" of the tubular part 22"a of the ring 22", as shown schematically in FIG. 7, or again offset towards the axial end on the side of the radial collar 22b, as shown schematically in FIG. 6, or on the contrary offset towards the other axial end of this tubular part 22"a, as shown in FIG. 8. A choice is made between these different shapes and positions of the convex cambered part of the inner radial contact surface of a ring such as 22" so that under the load, particularly the static load, applied to the pivoting casing 2 and therefore to the corresponding bearing 19, this inner radial contact surface assumes a substantially cylindrical shape of circular cross-section, which yields a Hertz pressure curve such as the relatively flat, low-amplitude curve 43 in FIG. 5, with no pressure peaks at the axial ends.

The combined use of plain bearings 19 equipped with wear take-up rings such as 22, 22' and above all 22", and an axial play take-up device 23 secures a considerable reduction in axial play along the pivot axis B—B, and therefore practically eliminates axial movement of the propulsion system comprising a rotor 14 and an associated pivoting power transmission unit 1, as well as a considerable reduction in the pressures in the associated bearings 19.

This results in better dynamic behaviour of the propulsion system and elimination of false Brinelling in the bearings 19.

The invention has now been described in detail for purposes of clarity and understanding. However, it will be appreciated that certain changes and modifications may be practised within the scope of the appended claims.

What is claimed is:

1. A pivoting power transmission unit for transmitting rotational drive to at least one driven component configured to revolve about an axis of rotation and configured to be swivelled about a pivot axis substantially perpendicular to said axis of rotation, said transmission unit comprising a casing mounted so as to pivot relative to two stationary and rigid side parts of a support by two coaxial bearings about said pivot axis and spaced at a distance from each other along the pivot axis, wherein the two bearings are plain bearings, each of which comprises:

a stationary part integral with one respectively of the two side parts of said support, and comprising a substantially cylindrical sleeve;

a swivelling part integral with said pivoting casing and comprising a substantially cylindrical annular trunnion mounted so as to swivel about said sleeve of the stationary part of said bearing; and a wear take-up ring, based on a material with a low coefficient of friction, and comprising a cylindrical tubular part held axially between said sleeve of said stationary part and said trunnion of said moving part, and a radial collar projecting radially outwards from said tubular part and relative to its axis, and integral with one axial end of said tubular part which faces towards the respective side part of the support;

and wherein the transmission unit further comprises a device to take up play along the pivot axis, associated with at least one bearing so as to push the wear take-up ring and swivelling part of its corresponding bearing axially away from its respective side part of the support.

2. A pivoting power transmission unit according to claim 1, wherein the substantially cylindrical sleeves of the stationary parts of the two bearings are substantially coaxial with the pivot axis and extend towards each other from the side parts of the support.

3. A pivoting power transmission unit according to claim 1, wherein the substantially cylindrical annular trunnions of the swivelling parts of the two bearings are substantially coaxial with the pivot axis.

4. A transmission unit according to claim 1, wherein said play take-up device comprises at least one annular piston, fitted so as to slide with sealing, along the pivot axis, in at least one annular chamber made in at least one stationary side part of said support and opening towards the wear take-up ring of said bearing associated with said play take-up device, said at least one annular chamber being fed with fluid under pressure, so that said annular piston bears axially against the radial collar of said wear take-up ring, which pushes the swivelling part of said bearing and said pivoting casing relative to the support, along the pivot axis.

5. A transmission unit according to claim 4, wherein said annular chamber is fed with fluid under pressure by at least one tapping from at least one lubrication circuit of said transmission unit.

6. A transmission unit according to claim 4, wherein said annular piston has a bearing face covered at least partly with a coating based on a material with a low coefficient of friction, by which the piston bears against said collar of said wear take-up ring.

7. A transmission unit according to claim 6, wherein said coating of the piston and said wear take-up ring are produced on the basis of the same material with a low coefficient of friction.

8. A transmission unit according to claim 1, wherein the wear take-up ring of at least one bearing is attached to said swivelling part of said bearing.

9. A transmission unit according to claim 4, wherein said wear take-up ring is attached to said swivelling part of the corresponding bearing by at least three screws passing through, in a direction substantially parallel to the pivot axis, said radial collar, in an area located outside the area of contact with the annular piston, and screwed into said swivelling part of said corresponding bearing.

10. A transmission unit according to claim 1, wherein said tubular part of said wear take-up ring of at least one bearing has an inner radial contact surface with a slightly cambered shape, convex towards the pivot axis, the convex cambered shape having an amplitude and being located such that said inner radial contact surface assumes a substantially cylindrical shape of circular cross-section, when a load is applied to the said pivoting casing.

11. A transmission unit according to claim 10, wherein said inner radial contact surface of said wear take-up ring of at least one bearing has, at least one of its two axial ends, a relieved area in the form of a chamfer or inclined flat.

12. A transmission unit according to claim 1, wherein said bearings are stressed over a limited angular sector of pivoting, of about 110°, with a low speed of rotation of between about 1 and about 2 rpm, of said pivoting casing under static load, about the pivot axis.

* * * * *